Mar. 27, 1923.

L. E. RAY

CUSHION TIRE

Filed Aug. 26, 1922.

L. E. Ray,
Inventor

By C. A. Snow & Co.
Attorney

Patented Mar. 27, 1923.

1,449,549

UNITED STATES PATENT OFFICE.

LONEY EDGAR RAY, OF OIL TROUGH, ARKANSAS.

CUSHION TIRE.

Application filed August 26, 1922. Serial No. 584,579.

*To all whom it may concern:*

Be it known that I, LONEY E. RAY, a citizen of the United States, residing at Oil Trough, in the county of Independence and State of Arkansas, have invented a new and useful Cushion Tire, of which the following is a specification.

This invention relates to cushion tires for vehicles, and the object thereof is to provide a tire of this character which while sufficiently resilient to absorb shocks is strong and durable and will stand hard usage.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
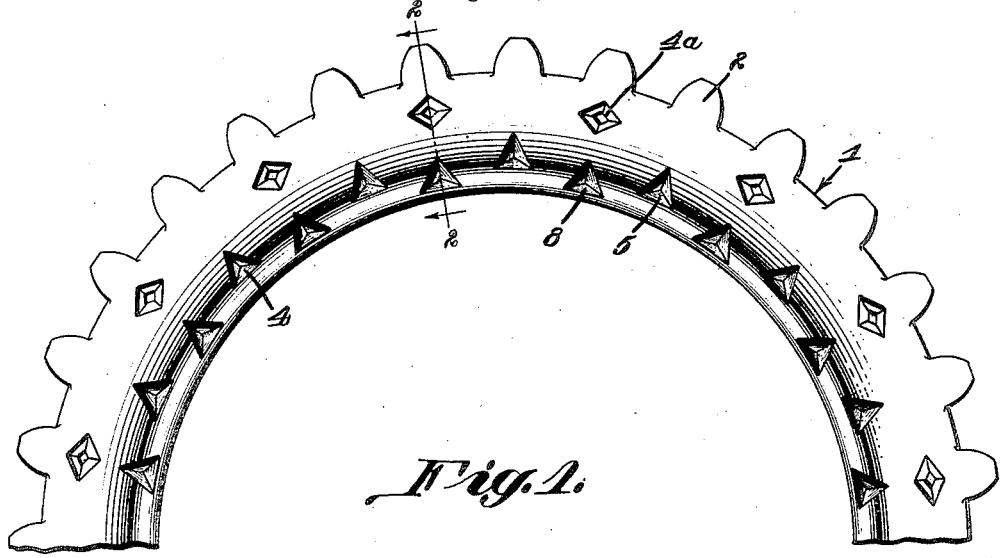
Figure 2:
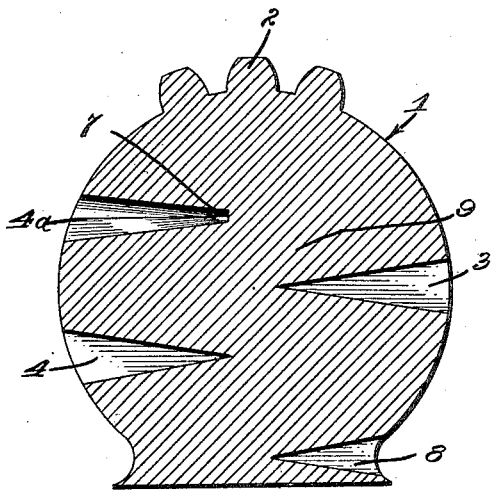

Figure 1 represents a side elevation of a portion of a vehicle tire embodying this invention, and Fig. 2 is a transverse section thereof.

The tire 1 constituting this invention is composed of solid live rubber and when desired for use as an anti-skid tire is provided on its periphery with a plurality of projections 2 which may be of any desired configuration such as are commonly used for this purpose.

This tire 1 is provided in its opposed sides or faces with a plurality of series of transversely extending openings or bores. Those shown on one side being indicated at 3, while those on the other side are marked 4.

The series ot one side are arranged to alternate with those on the other, and the bores of the adjacent series are staggered in relation to each other.

These bores may be of any desired configuration in cross section, being preferably triangular as shown at 5 or diamond shaped as shown at 4ª, and all of them taper to a point at their inner ends as shown at 7.

Arranged adjacent the inner perimeter of the tire is another series of bores 8 which extend transversely of the tire, and are shown triangular in cross section and which also taper to a point at their inner ends.

The bores of the series in the opposed faces of the tire extend inwardly terminating at points spaced from those in the other face so that a solid live rubber center 9 is formed between them.

In the use of this tire, the weight of the vehicle and its load will operate to compress the tire radially in the manner usual with pneumatic tires, the bores providing sufficient elasticity to cushion the vehicle and absorb shocks.

The tire constructed in accordance with this invention will be free from the objectionable features of pneumatic tires, while at the same time affording the same advantages thereof.

I claim:—

A cushion tire composed of solid live rubber having bores extending transversely from the opposed sides thereof and terminating short of the center of the tire, the bores at one side of the tire being arranged in staggered relation with those on the other side, said bores being diamond-shape in form with their small ends extended inwardly, and a series of bores arranged adjacent the inner perimeter of the tire, the arrangement of said transversely extending bores being such as to provide a solid live rubber center between them.

In testimony that I claim the foregoing as my own, I have hereto affixed my signature in the presence of two witnesses.

LONEY EDGAR RAY.

Witnesses:
H. W. LUCAS,
A. M. JOHNSON.